United States Patent Office 3,391,113
Patented July 2, 1968

3,391,113
RAPID CURING EPOXY RESIN
COMPOSITIONS
Romeo Lopez and James A. Clarke, Lake Jackson, Tex.,
assignors to The Dow Chemical Company, Midland,
Mich., a corporation of Delaware
No Drawing. Filed Oct. 14, 1966, Ser. No. 586,662
8 Claims. (Cl. 260—47)

ABSTRACT OF THE DISCLOSURE

This application discloses thermosettable resin mixtures which comprise an epoxy resin having a plurality of 1,2-epoxide groups, curing amounts of dicyandiamide and from 0.01 to 1 part by weight per part of dicyandiamide of a tetra-methyl or tetra-ethyl guanidine.

This invention relates to epoxy resin compositions which can be cured rapidly at low temperature to a thermoset resin. These rapid curing resin compositions comprise an epoxy resin having dicyandiamide as a curing agent and a tetra-alkyl guanidine as an accelerator.

Dicyandiamide or cyanoguanidine has been used as a latent curing agent for epoxy resins (U. S. Patent 2,637,715). There is substantially no reaction between the curing agent and resin over long periods of time at ambient temperatures. The mixture must be heated to a temperature of about 330° F. and held at that temperature for an extended period of time to effect the cure. The rate of cure increases with temperatures up to about 410–430° F. where the cure takes only about ten minutes. The rate of cure varies depending upon the curing agent used. Other latent curing agents found to be successful are the dihydrazides and carbohydrazides. Details of the use of these curing agents can be found in U.S. Patents 2,847,395 and 3,014,009, respectively.

We have found that the cure of epoxy resins with dicyandiamide can be significantly accelerated with certain tetra-alkyl guanidines, while at the same time, the peak temperature for the maximum rate of reaction is lowered to a point where low pressure steam can be utilized as the means of heating. Thus, our invention enables the curing of epoxy resins with dicyandiamide as a latent curing agent with the ability to decrease significantly the temperature at which the latent curing agent produces a cure of short duration.

The tetra-alkyl guanidines which can be used in accordance with this invention may be represented by the following formula:

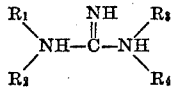

wherein $R_1$, $R_2$, $R_3$ and $R_4$ are independently selected from a lower alkyl group consisting of methyl and ethyl. Specific preferred compounds used having this formula are tetramethyl guanidine and tetraethyl guanidine.

The tetra-alkyl guanidines of this invention are employed in the range of from about 0.01 to about 1.0 part by weight and preferably from about 0.1 to about 0.5 part by weight based on the quantity of dicyandiamide employed. Below about 0.01 part by weight of the tetra-alkyl guanidine, no appreciable reduction in the peak exotherm is obtained. Although greater than 1.0 part by weight may be employed without deleteriously affecting the composition, there is no significant advantage. Generally, the dicyandiamide is used in amounts of from about 5 to 20 parts per 100 parts of epoxy resin.

In conjunction with the finding that the tetra-alkyl guanidines will decrease the peak temperature for the maximum rate of reaction in the curing of epoxy resins with dicyandiamide, the shelf life, at room temperature, of the curing complex is relatively low. In this regard, it has been found that the addition of benzoic acid and halogen derivatives of benzoic acid, such as o-chlorobenzoic acid or p-chlorobenzoic acid to the curing complex will increase the shelf life from about 2 days to 7 days, while leaving the cure time and the peak temperature of the maximum rate of reaction relatively unaffected. The chlorobenzoic acids are the most acidic and are often preferred. The benzoic acid and their halogen derivatives as described herein may be employed in the range of from about 0.1 to about 1.0 and preferably from about 0.5 to about 1.0 part by weight based on the quantity on the tetra-alkyl guanidine employed. Concentrations of such materials below about 0.1 part by weight results in no appreciable increase in shelf life. Although greater than 1.0 part by weight of such materials may be employed without deleteriously affectiing the composition, there is no significant advantage of such increased amounts.

Dicyandiamide has been useful as a latent curing agent for all of the common epoxy resins. The tetra-alkyl guanidines, as herein defined, may be used according to this invention to accelerate the cure of any of these dicyandiamide-epoxy resin systems. Although, the exact mechanism by which the tetra-alkyl guanidines accelerate the cure of dicyandiamide-epoxy resin mixtures is not fully understood, it is suspected that a complex formation through hydrogen bonding is the basis for the observed behavior. It is believed that this complex causes the dicyandiamide to decompose more readily into its curing substituents. Among the epoxy resins which may be cured with this combination of agents are the polyglycidyl compounds represented by the following formulae:

(A) 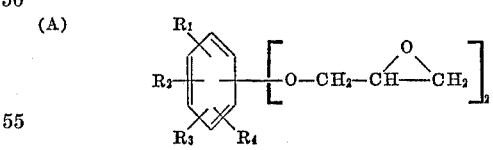

wherein $R_1$, $R_2$, $R_3$, and $R_4$ are independently selected from the group consisting of a hydrogen, lower alkyl group and a halogen.

(B) 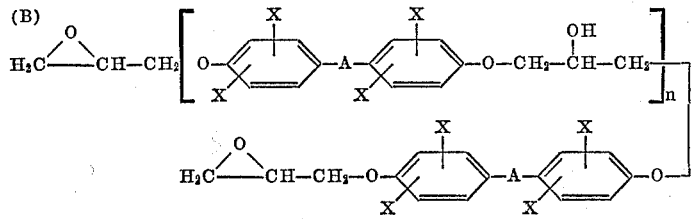

wherein A is selected from the group consisting of alkylene,

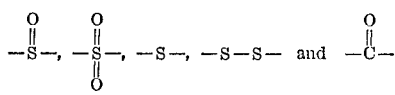

and wherein X is selected from hydrogen and a halogen; and wherein the value of n is from about zero to about 18.

(C)

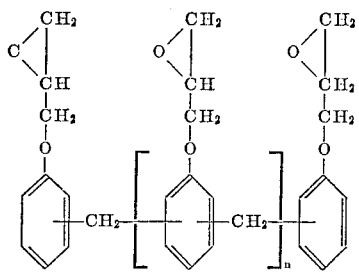

wherein the value of n is from about zero to about 4.

(D)

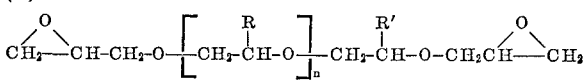

wherein R and R' are independently selected from hydrogen and a lower alkyl group; and wherein the value of n varies from about 3 to about 6., The temperature at the peak exotherm of epoxy resins cured according to this invention were determined on a differential thermal analyzer in a manner similar to that described by H. C. Anderson in Analytical Chemistry, 32, 12, 1592–1595 (1960). The path temperature for a given run corresponds to that at which the maximum rate of reaction is obtained. This peak temperature recommends an optimum oven temperature to be used for a rapid cure. Methods in which these resins can be prepared are illustrated in the following examples, wherein all parts are by weight.

Example I 100 parts by weight of the diglycidyl ether of 2,2-bis (4-hydroxyphenyl)propane having an epoxide equivalent weight of 186–192 and a viscosity of 11,000–14,000 cps. and containing 0.2% by weight of the reaction product of 1.0 mole of the diglycidyl ether of 2,2-bis(4-hydroxyphenyl)propane, having an average epoxide equivalent weight of 186–192, with about 1½ moles of monoethylene glycol; was placed in reactor vessel and maintained at a temperature of about 25° C. A harder complex was prepared by adding 10 to 20 parts by weight of dicyandiamide (per 100 parts of epoxy resin) to from 0 to 5 parts by weight of tetramethyl guanidine and grinding the mixture to a powder form. Although the tetramethyl guanidine is a liquid, the resultant hardener complex is a solid. The hardener complex was added to the liquid epoxy resin together with 5 parts by weight of anhydrous colloidal silica, as a thixotroping agent, and 70 parts by weight of aluminum powder, as a filler, and the resin mixture cured in a differential thermal analyzer.

The above mixtures were evaluated as adhesives for metals utilizing the following general procedures. In each of a series of experiments two strips of 20-gauge steel, 12 inches in length and 1 inch wide, were sand-blasted at one end, spread with adhesive and joined by forming a 1 inch by ½ inch overlap joint. Individual samples were then cured at varying temperatures after which the assemblies were cooled to room temperature and the resulting bond tested to failure using a commercial tensile test apparatus. The following Tables I, II, and III show the lap shear strength values in pounds per square inch (p.s.i.) for the above mixture at a given cure time and oven temperature for a certain ratio of dicyandiamide and tetra-methyl guanidine in the mixture.

TABLE I

[Oven Temperature=140° C. 10 Parts Dicyandiamide]

| Resin Formulation No. | Cure Time, min. | Parts Tetramethyl Guanidine | | |
|---|---|---|---|---|
| | | 2 | 3 | 5 |
| 1 | 10 | 4,280 | 3,420 | 5,730 |
| 2 | 15 | 4,900 | 4,370 | 5,620 |
| 3 | 20 | 5,100 | 5,100 | 5,700 |
| 4 | 30 | 5,120 | 5,120 | 6,060 |

TABLE II

[Oven Temperature=110° C. 10 Parts Dicyandiamide]

| Resin Formulation No. | Cure Time, min. | Parts Tetramethyl Guanidine | | | |
|---|---|---|---|---|---|
| | | 0 | 1 | 2 | 5 |
| 5 | 10 | nil | nil | 720 | 1,040 |
| 6 | 20 | nil | 180 | 2,730 | 2,910 |
| 7 | 30 | nil | 1,050 | 2,940 | 3,130 |
| 8 | 60 | nil | 4,550 | | 5,030 |

TABLE III

[Oven Temperature=110° C. 20 Parts Dicyandiamide]

| Resin Formulation No. | Cure Time, min. | Parts Tetramethyl Guanidine | | |
|---|---|---|---|---|
| | | 1 | 2 | 5 |
| 9 | 10 | | 930 | 1,650 |
| 10 | 20 | 360 | 3,730 | 3,810 |
| 11 | 30 | 1,200 | 3,730 | 3,500 |
| 12 | 45 | 2,940 | 5,000 | 4,690 |
| 13 | 60 | 3,630 | 4,200 | 5,100 |
| 14 | 120 | 4,080 | 4,200 | 4,830 |

The data presented in the above tables illustrate the ability of tetramethyl guanidine to reduce the temperature required for curing epoxy resins using dicyandiamide.

Example II

In each of a series of experiments, additional formulations were prepared by the procedure as set forth in Example I (using 100 parts of epoxy resin and 10 parts of dicyandiamide) and using as substitutes for the tetramethyl guanidine the following: (15) no accelerator, (16) 3 parts acetyl guanidine (AG), (17) 3 parts tetramethyl guanidine (TMG) and 3 parts benzoic acid (BA) as stabilizer, and (18) 3 parts tetramethyl guanidine. The following Table IV illustrates the effectiveness of tetramethyl guanidine in obtaining a lower peak exotherm. This table also shows how the addition of benzoic acid as a stablizer does not significantly affect the obtaining of a lower peak exotherm.

TABLE IV

| Resin Formulation No. | Quantity and Type Accelerator | Peak Exotherm, 0° C. |
|---|---|---|
| 15 | None | 209 |
| 16 | 3 parts AG | 200 |
| 17 | 3 parts TMG; 3 parts BA | 157 |
| 18 | 3 parts TMG | 140 |

In resin formulation No. 17, benzoic acid was added as a stabilizer because of the low shelf life that is exhibited by the dicyandiamide-tetramethyl guanidine complex hardener. At room temperature, the complex without benzoic acid had a shelf life of approximately 2 days. The complex with the benzoic acid had a shelf life of approximately 7 days, at room temperature.

Example III 40 parts by weight of the diglycidyl ether of 2,2-bis-(4-hydroxyphenyl) propane having an epoxide equivalent weight of 172–176 and a viscosity of 4,000–5,500 cps. were placed in a vessel under normal room temperature. Thereafter, a hardener complex consisting of 4 parts of dicyandiamide (per 100 parts of epoxy resin) and 0.3 part of tetramethyl guanidine was added to the liquid epoxy resin along with 2 parts of anhydrous colloidal silica as a thixotroping agent.

Samples of the above formulation, with varying amounts of benzoic acid and its halogen derivatives as stabilizers, were prepared.

Using 11.15 parts of the above formulation, the following four resin formulations were obtained (19) no benzoic acid, (20) 0.25 part benzoic acid (BA), (21) 0.32 part o-chlorobenzoic acid (o-CBA), and (22) 0.32 part p-chlorobenzoic acid (p-CBA). The resin formulations were cured in a differential thermal analyzer.

The following Table V shows values, including the initial exotherm temperatures, that illustrate the stabilizing action of benzoic acid and the chlorobenzoic acids. Also, it shows the insignificant increase in the temperature at the peak exotherm caused by the stabilizer.

TABLE V

| Resin Formulation No. | Quantity and Type Stabilizer | Initial Exotherm Temp., °C. | Peak Exotherm Temp., °C. |
|---|---|---|---|
| 19 | None | 90 | 146.5 |
| 20 | 0.25 part BA | 108 | 148 |
| 21 | 0.32 part o-CBA | 112 | 151.5 |
| 22 | 0.32 part p-CBA | 112 | 152 |

Example IV 100 parts by weight of an epoxy novolac resin having an epoxide equivalent weight of 176 were placed in a vessel under normal room temperature. A mixture of 10 parts by weight of dicyandiamide and 3 parts by weight of tetramethyl guanidine was then mixed with the epoxy resin. The formulation was designated as resin formulation No. 23. A formulation No. 24 of the same composition, but without the tetramethyl guanidine, was also used in the experiment.

As formulation No. 25, 100 parts by weight of the diglycidyl ether of a thiobisphenol having an epoxide equivalent weight of 289, was placed in a vessel. A mixture of 10 parts by weight of dicyandiamide and 3 parts by weight of tetramethyl guanidine was then mixed with the epoxy resin. A formulation No. 26 of the same composition, but without the tetramethyl guanidine, was also used in the experiment.

The following Table VI illustrates the difference in the peak exotherm that is obtained with and without the presence of tetramethyl guanidine. The lower peak exotherm is desirable for the utilization of low pressure steam as the means of heating.

Resin formulation No.:     Peak exotherm, °C.
    23 novolac resin+3 phr. TMG _____ 137
    24 novolac resin—no TMG _____ 195
    25 sulfur resin+3 phr. TMG _____ 161
    26 sulfur resin—no TMG _____ 185

These resin systems may be used in any of the applications where a high temperature cure is employed. They are particularly suitable as metal adhesives, reinforced plastics, coatings, potting compounds, and the like. These resin systems are particularly useful in fluid bed coating applications.

Although the tetra-alkyl guanidine accelerators are blended with the dicyandiamide hardener and then added to the epoxy resin, the accelerators and dicyandiamide may be added as individual components and blended separately if desired.

What is claimed is:

1. A thermosettable resin mixture comprising an epoxy resin, having a plurality of 1,2-epoxide groups curing amounts of dicyandiamide and from about 0.01 to about 1 part by weight of a tetra-alkyl guanidine per part of dicyandiamide, said tetra-alkyl guanidine have the formula

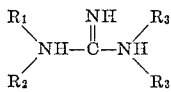

wherein $R_1$, $R_2$, $R_3$, and $R_4$ are independently selected from an alkyl radical having from 1 to 2 carbon atoms.

2. The resin mixture of claim 1 wherein said tetra-alkyl guanidine is tetramethyl guanidine.

3. The resin mixture of claim 1 wherein said tetra-alkyl guanidine is tetraethyl guanidine.

4. The mixture of claim 1 containing in addition thereto and in combination therewith up to about 1 part per part of tetra-alkyl guanidine of a compound selected from the group consisting of benzoic acid, o-chlorobenzoic acid and p-chlorobenzoic acid.

5. A curing agent for epoxy resins having a plurality of 1,2-epoxide groups consisting essentially of a mixture of dicyandiamide and from about 0.1 to 0.5 part by weight per part of said dicyandiamide of a tetra-alkyl guanidine having the formula

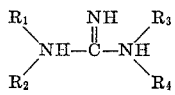

wherein $R_1$, $R_2$, $R_3$, and $R_4$ are independently selected from an alkyl radical having from 1 to 2 carbon atoms.

6. The curing agent of claim 5 wherein said tetra-alkyl guanidine is tetramethyl guanidine.

7. The curing agent of claim 5 wherein said tetra-alkyl guanidine is tetraethyl guanidine.

8. The curing agent of claim 5 containing in addition thereto and in combination therewith up to about 1 part by weight per part of tetra-alkyl guanidine of a compound selected from the group consisting of benzoic acid, o-chlorobenzoic acid, and p-chlorobenzoic acid.

References Cited

UNITED STATES PATENTS 3,030,247    4/1962    Schurb.

WILLIAM H. SHORT, *Primary Examiner.*

T. D. KERWIN, *Assistant Examiner.*